US008899759B2

(12) United States Patent
Tsukagoshi

(10) Patent No.: US 8,899,759 B2
(45) Date of Patent: Dec. 2, 2014

(54) PROJECTOR AND METHOD FOR CONTROLLING THE PROJECTOR

(75) Inventor: Shinichi Tsukagoshi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 346 days.

(21) Appl. No.: 13/419,739

(22) Filed: Mar. 14, 2012

(65) Prior Publication Data

US 2012/0242908 A1 Sep. 27, 2012

(30) Foreign Application Priority Data

Mar. 22, 2011 (JP) ................................. 2011-062560

(51) Int. Cl.
G03B 21/14 (2006.01)
H04N 9/31 (2006.01)
(52) U.S. Cl.
CPC .................................. H04N 9/3179 (2013.01)
USPC ............................................ 353/79; 353/122
(58) Field of Classification Search
USPC ............................................ 353/79, 121, 122
See application file for complete search history.

(56) References Cited

U.S. PATENT DOCUMENTS

| 7,055,956 | B2 * | 6/2006 | Olson et al. ..................... 353/30 |
| 7,320,520 | B2 * | 1/2008 | Johnson .......................... 353/15 |
| 8,540,378 | B2 * | 9/2013 | Maruyama .................... 353/101 |
| 2008/0013053 | A1 * | 1/2008 | Anson ............................. 353/69 |
| 2008/0111976 | A1 * | 5/2008 | Takito et al. .................. 353/121 |
| 2009/0033888 | A1 * | 2/2009 | Nozaki et al. ................. 353/119 |
| 2009/0040470 | A1 | 2/2009 | Fukui et al. |
| 2009/0213279 | A1 | 8/2009 | Ichieda |
| 2010/0103330 | A1 * | 4/2010 | Morrison et al. ............. 348/744 |
| 2012/0026088 | A1 * | 2/2012 | Goran ............................ 345/158 |
| 2012/0182531 | A1 * | 7/2012 | Ueno et al. ..................... 353/85 |

FOREIGN PATENT DOCUMENTS

| CN | 101521774 A | 9/2009 |
| JP | 10-039945 A | 2/1998 |
| JP | 2005-99588 A | 4/2005 |
| JP | 2006-11346 A | 1/2006 |
| JP | 2006-218968 A | 8/2006 |
| JP | 2006-349893 A | 12/2006 |
| JP | 2008-310132 A | 12/2008 |
| JP | 2009-035025 A | 2/2009 |
| JP | 2009-042444 A | 2/2009 |
| JP | 2009-168977 A | 7/2009 |
| JP | 2009-188518 A | 8/2009 |
| JP | 2010-169862 A | 8/2010 |
| JP | 2012-198397 A | 10/2012 |
| WO | WO-2009-016929 A | 2/2009 |

* cited by examiner

*Primary Examiner* — William C Dowling
(74) *Attorney, Agent, or Firm* — ALG Intellectual Property, LLC

(57) ABSTRACT

A projector includes: a first source input section; a second source input section; and a mode setting section that sets a projection mode, wherein when a first projection mode is set by the mode setting section, image display or sound output is performed based on an input signal that is input via any one of the first source input section and the second source input section, and when a second projection mode is set by the mode setting section, image display or sound output is performed based on an input signal that is input via the second source input section.

16 Claims, 13 Drawing Sheets

PROJECTOR AND METHOD FOR CONTROLLING THE PROJECTOR

CROSS-REFERENCE

The present application claims priority from Japanese Patent Application No. 2011-062560 filed on Mar. 22, 2011, which is hereby incorporated by reference in its entirety.

BACKGROUND

A projector as a display device has been used in various situations such as conferences in the office and watching movies etc. at home. Such a projector can be installed easily and is used not only in a common state in which it is set on the floor but also in a state in which it is mounted on the ceiling. As a result, by setting the installation mode in accordance with an installation state of a main body of the projector, the projector can perform display in accordance with the installation state.

Various types of such projectors that perform control switching in accordance with the installation state have been proposed. For example, in JP-A-2008-31032 (Patent Document 1) and JP-A-2009-04244 (Patent Document 2), projectors that switch control based on the installation mode which can be set in accordance with the installation state are disclosed. Specifically, in Patent Document 1, a projector that switches temperature control when a ceiling-mount mode is set as the installation mode is disclosed. In Patent Document 2, a projector that has an angle sensor and switches temperature control when a ceiling-mount installation state is detected by the angle sensor is disclosed.

Incidentally, the projector has recently gone multifunctional, and the user-friendliness of the projector has further improved. The techniques disclosed in Patent Document 1 and Patent Document 2 are the techniques by which the projector can be used in any installation state in a similar manner by switching control based on the installation state of a projector main body. However, it is sometimes preferable to put a restriction on the user's use of a function that is unfit for use in some installation states of the main body of the projector. With the techniques disclosed in Patent Document 1 and Patent Document 2, however, it is impossible to put a restriction on the user's use of the function that is unfit for use in some installation states of the main body of the projector. The user may be informed of such a function that is unfit for the user's use by a note or the like in a product manual etc., but there is a possibility that the user uses the function by mistake.

SUMMARY

Various embodiments may provide a projector that can put a restriction on a function that is unfit for user's use, a method for controlling the projector, and the like.

According to at least one embodiment of the disclosure, there is provided a projector including: a first source input section; a second source input section; and a mode setting section configured to set a projection mode, when a first projection mode is set by the mode setting section, image display or sound output is performed based on an input signal that is input via any one of the first source input section and the second source input section, and, when a second projection mode is set by the mode setting section, image display or sound output is performed based on an input signal that is input via the second source input section.

In this aspect, when the first projection mode is set by the mode setting section, image display or sound output is performed based on an input signal that is input via any one of the first source input section and the second source input section. On the other hand, when the second projection mode is set by the mode setting section, it is possible to perform image display or sound output based on an input signal that is input via the second source input section, excluding the first source input section. As a result, by setting the projection mode, it is possible to put a restriction on a function that is unfit for user's use when a source that is connected to the first source input section is used.

It is preferable that the projector further includes a source selection image generating section configured to generates a source selection image, when the first projection mode is set by the mode setting section, the source selection image generating section generates a source selection image displaying information corresponding to a source input section of the first source input section and the second source input section, the source input section to which a source is connected, and, when the second projection mode is set by the mode setting section, the source selection image generating section generates a source selection image displaying information corresponding to the second source input section to which a source is connected.

In this aspect, when the first projection mode is set, the source selection image generating section generates a source selection image displaying information corresponding to a source input section of the first source input section and the second source input section, the source input section to which a source is connected. Moreover, when the second projection mode is set, the source selection image generating section generates a source selection image displaying information corresponding to the second source input section, excluding the first source input section, the second source input section to which a source is connected. By doing so, the user cannot select, by using the source selection image, a function that is unfit for user's use when a source that is connected to the first source input section is used. This makes it possible to put a restriction on the function while presenting specifications to the user in an easy-to-understand manner.

It is preferable that the first source input section is an external device connecting section which is configured so that an external device having an output terminal can be connected to the external device connecting section.

According to this aspect, when the first projection mode is set by the mode setting section, image display or sound output is performed based on an input signal that is input via any one of the external device connecting section to which an external device is connected and the second source input section. On the other hand, when the second projection mode is set by the mode setting section, it is possible to perform image display or sound output based on an input signal that is input via the second source input section, excluding the external device connecting section. By doing so, by setting the projection mode, it is possible to put a restriction on a function that is unfit for user's use when an external device is used as a source.

It is preferable that the projector further includes a dock connector in which the external device connecting section is provided, the dock connector which is configured so that the dock connector can be pulled out in a given direction in which the dock connector is pulled, and the dock connector is configured so that, in a state in which the dock connector is pulled out in the given direction in which the dock connector is pulled, the external device can be connected thereto from a connection direction intersecting with the given direction in which the dock connector is pulled.

According to this aspect, in addition to the above-described effects, the dock connector can be housed, which can contribute to the reduction in size of the projector, and it is possible to perform operation by using an operating screen of the external device without blocking an image which is projected by the projector.

It is preferable that the mode setting section sets a mode corresponding to an installation state of a projector main body as the projection mode.

According to this aspect, depending on the installation state of the projector main body, it is possible to put a restriction on a function that is unfit for user's use when a source that is connected to the first source input section is used.

It is preferable that the first projection mode is a floor-standing mode, and the second projection mode is a ceiling-mount mode.

According to this aspect, when the projector is set on the floor, image display or sound output can be performed by using a source that is connected to the first source input section. Moreover, when the projector is mounted on the ceiling, it is possible to put a restriction on a function that is unfit for user's use when a source that is connected to the first source input section is used.

According to at least one embodiment of the disclosure, there is provided a method for controlling a projector including a first source input section, a second source input section, and a mode setting section that sets a projection mode, the method including, performing image display or sound output based on an input signal that is input via any one of the first source input section and the second source input section when a first projection mode is set by the mode setting section, and, performing image display or sound output based on an input signal that is input via the second source input section when a second projection mode is set by the mode setting section.

In this aspect, when the first projection mode is set by the mode setting section, image display or sound output is performed based on an input signal that is input via any one of the first source input section and the second source input section. On the other hand, when the second projection mode is set by the mode setting section, it is possible to perform image display or sound output based on an input signal that is input via the second source input section, excluding the first source input section. As a result, by setting the projection mode, it is possible to put a restriction on a function that is unfit for user's use when a source that is connected to the first source input section is used.

BRIEF DESCRIPTION OF THE DRAWINGS

The invention will be described with reference to the accompanying drawings, wherein like reference numbers reference like elements.

DESCRIPTION OF EXEMPLARY EMBODIMENTS

Hereinafter, an embodiment of the invention will be described in detail by using the drawings. It should be understood that the embodiment described below is not meant to limit unduly the scope of the invention claimed in the appended claims in any way, and all the configurations described below are not always necessary requirements to solve the problems of the invention.

Figure 1:
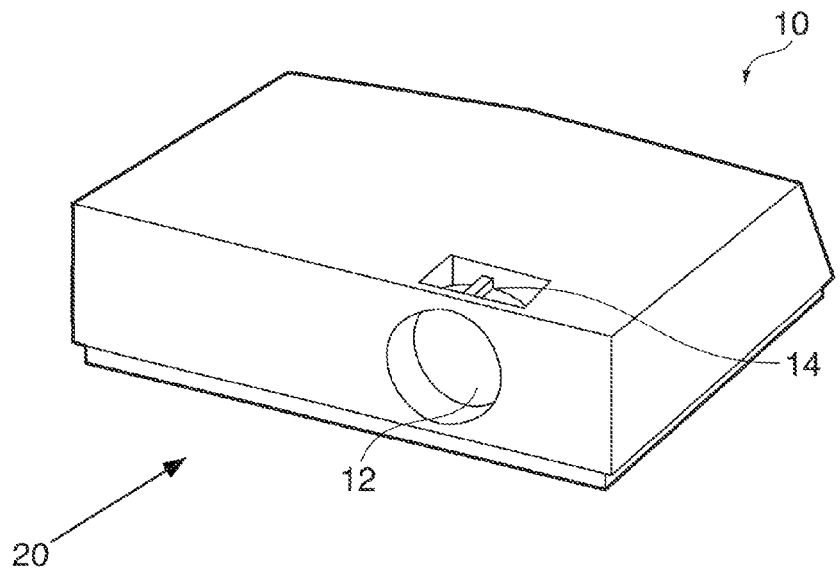
FIG. 1 is a schematic diagram of the appearance of a main body of a projector in an embodiment on the front side thereof.
Figure 2:
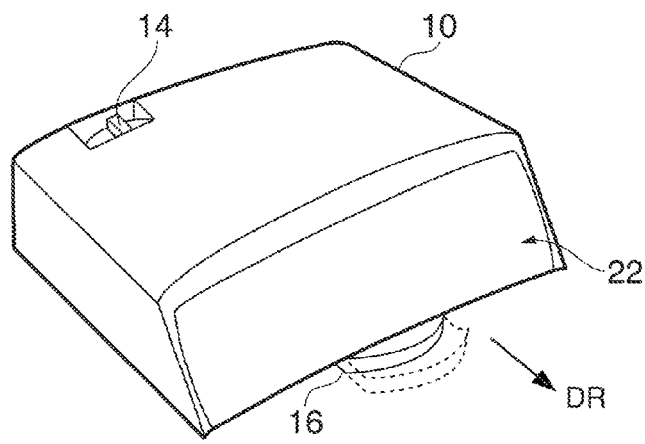
FIG. 2 is a schematic diagram of the appearance of the main body of the projector in the embodiment on the back side thereof.

In FIGS. 1 and 2, schematic diagrams of the appearance of a main body of a projector according to an embodiment of the invention are shown. FIG. 1 is a schematic diagram of the appearance of the main body of the projector on the front side thereof. FIG. 2 is a schematic diagram of the appearance of the main body of the projector on the back side thereof. In FIG. 2, such portions as are similar to those in FIG. 1 are identified with the same reference characters and their descriptions will be omitted as appropriate.

A projector (in a broad sense, a display device) 10 in this embodiment includes a projection lens 12 and a zoom ring 14. A picture is projected onto a screen by the projection lens 12 provided on a front 20 of the main body. The size of the picture is adjusted with operation of the zoom ring 14. To the projector 10, a video signal (in a broad sense, an input signal) is input from the outside, and the projector 10 projects the picture onto the screen based on the video signal.

The projector 10 can project the picture onto the screen based on the video signal etc. from a portable information apparatus (a portable apparatus or a portable information terminal; in a broad sense, an external device) as an external device provided with an output terminal (or an input/output terminal) as one of the video sources (the input sources). Therefore, the projector 10 is configured so that the portable information apparatus can be connected thereto, and video signals and sound signals (in a broad sense, input signals) accumulated in the portable information apparatus can be supplied to the projector 10 via the output terminal of the portable information apparatus. The projector 10 displays a picture and outputs sound based on the video signals and the sound signals accumulated in the portable information apparatus as a result of the user performing operation by using an operation panel provided in the main body or a remote control (not shown).

Such a portable information apparatus is connected to an apparatus connection connector (a portable information apparatus connecting section; in a broad sense, an external device connecting section) of the projector 10. The projector 10 includes, on a back 22 of the main body, a dock connector 16 in which the apparatus connection connector is provided. The dock connector 16 is configured so that it can be pulled out. As a result of the housed dock connector 16 being pulled out in a direction DR (forward direction) in which the dock connector 16 is pulled, the apparatus connection connector is exposed to the outside.

Figure 3:
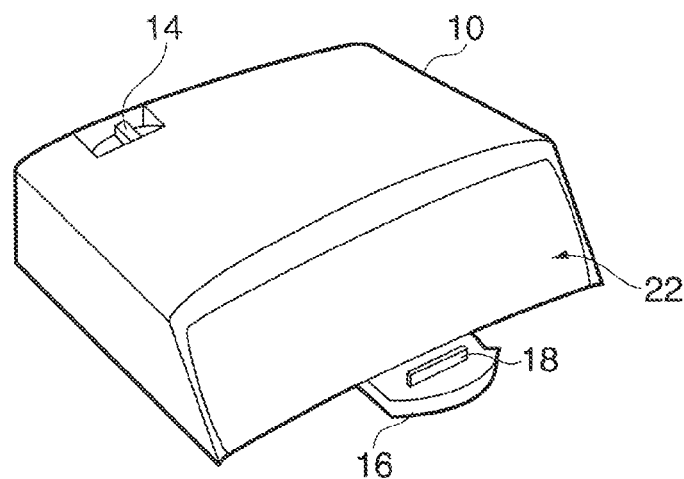
FIG. 3 is a schematic diagram of an apparatus connection connector provided in a dock connector of the projector in the embodiment.
Figure 4:
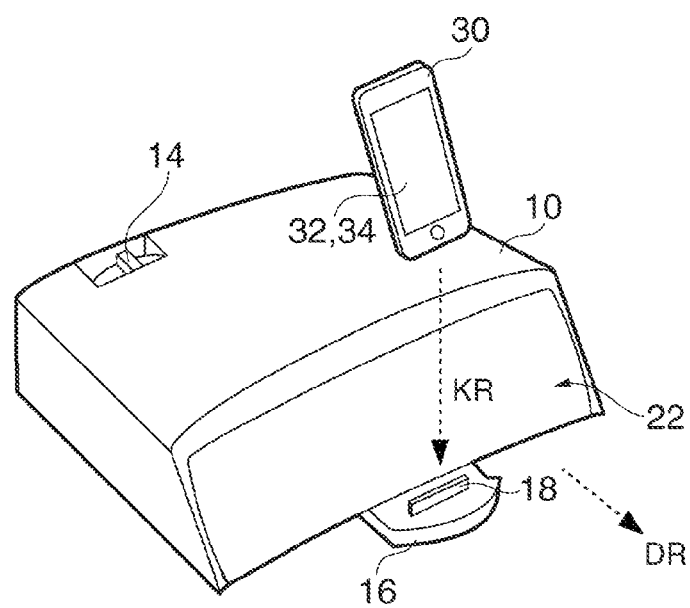
FIG. 4 is a diagram schematically showing how a portable information apparatus is connected to the apparatus connection connector in the embodiment.

In FIGS. 3 and 4, explanatory diagrams of the apparatus connection connector of the projector 10 are shown. FIG. 3 is a schematic diagram of the apparatus connection connector provided in the dock connector 16 of the projector 10. FIG. 4 schematically shows how the portable information apparatus is connected to the apparatus connection connector.

The apparatus connection connector 18 which is exposed to the outside when the housed dock connector 16 is pulled out is provided so as to face upward. Therefore, the portable information apparatus 30 is connected to the apparatus connection connector 18 from a connection direction KR intersecting with the direction DR in which the dock connector 16 is pulled. The portable information apparatus 30 includes a screen 32, and a touchpad operating screen 34 is provided on the screen 32. The operator performs various kinds of operations of the portable information apparatus 30 by operating the operating screen 34 while viewing the screen 32. For this reason, the portable information apparatus 30 is placed on the apparatus connection connector 18 in such a way that the operating screen 34 faces outward. In a state in which the portable information apparatus 30 is placed on the apparatus connection connector 18, the portable information apparatus 30 can output a video signal and a sound signal from the output terminal to the projector 10.

Moreover, in addition to the output function of the video signal etc., the portable information apparatus 30 has the function of communicating with an external device, and is configured so that it can also perform communication via a control signal line by being connected to the apparatus connection connector 18. Therefore, in a state in which the portable information apparatus is connected to the projector 10, various kinds of operations of the portable information apparatus are made possible by the operation panel or the like, and various kinds of operations of the projector 10 are made possible by operation of the portable information apparatus 30.

Figure 5:
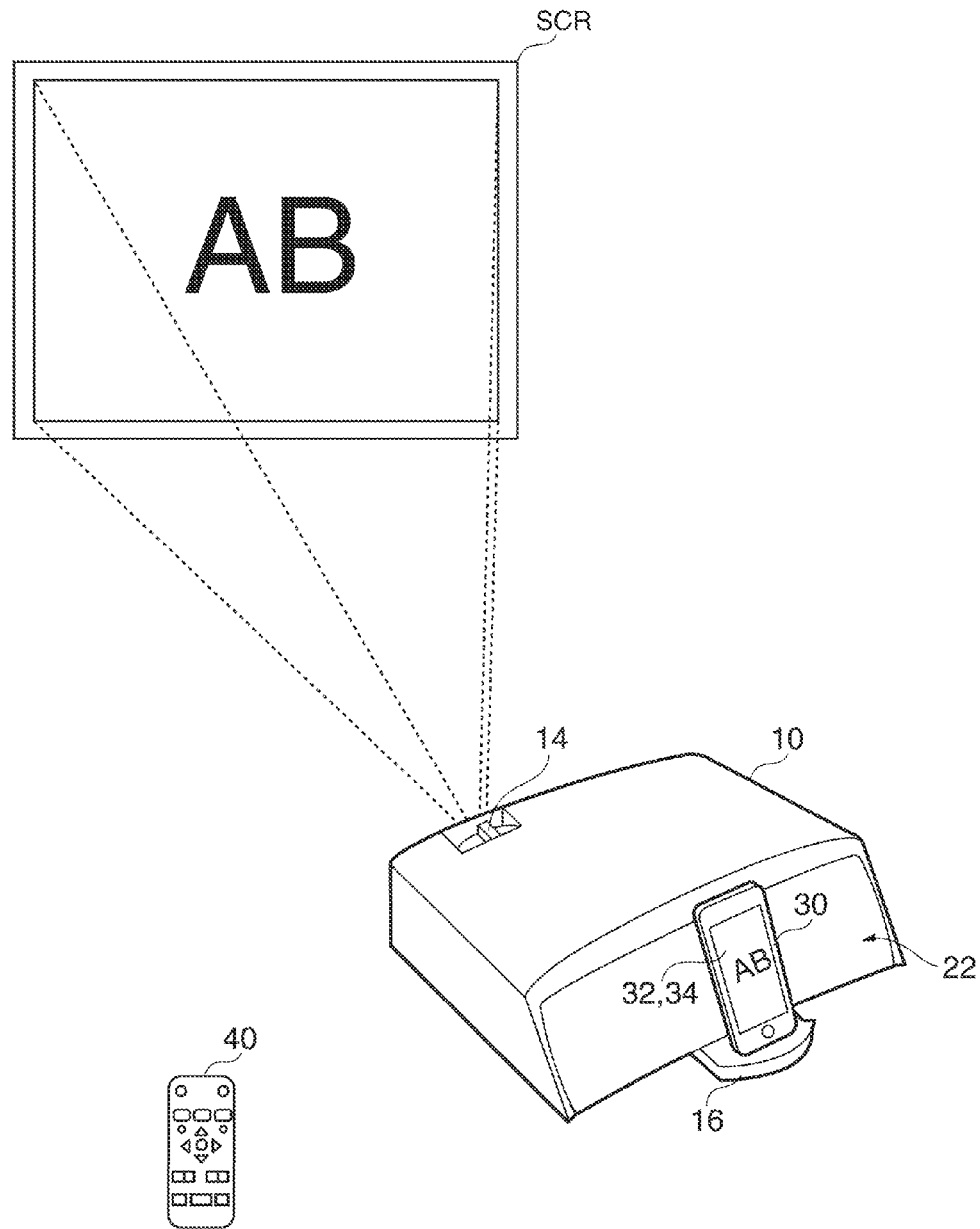
FIG. 5 is an explanatory diagram of a projector system including the projector in the embodiment.

In FIG. 5, an explanatory diagram of a projector system including the projector 10 in this embodiment is shown. In FIG. 5, such portions as are similar to those in FIG. 4 are identified with the same reference characters and their descriptions will be omitted as appropriate.

A projector system (in a broad sense, a display system) 50 includes the projector 10 and the portable information apparatus 30 connected to the projector 10. In a state in which the projector 10 is set on the floor, the portable information apparatus 30 is connected to the projector 10 as shown in FIG. 4. The projector 10 is operated as a result of the operation panel or the remote control 40 being operated and is also operated as a result of the operating screen 34 of the portable information apparatus 30 being operated. The projector system 50 can project an image displayed on the screen 32 of the portable information apparatus 30 onto a screen SCR by the projector 10 in a state in which the portable information apparatus 30 is connected to the apparatus connection connector 18.

The projector 10 can be used by being set on the floor and by being mounted on the ceiling. Therefore, the projector 10 in the projector system 50 shown in FIG. 5 is set in a floor-standing mode (in a broad sense, a first projection mode) as the installation mode. As a result, as shown in FIG. 5, the projector 10 set on the floor can display an image displayed on the screen 32 of the portable information apparatus 30 onto the screen SCR. On the other hand, when the projector 10 is used by being mounted on the ceiling, the projector 10 is set in a ceiling-mount mode (in a broad sense, a second projection mode) as the installation mode.

Figure 6:
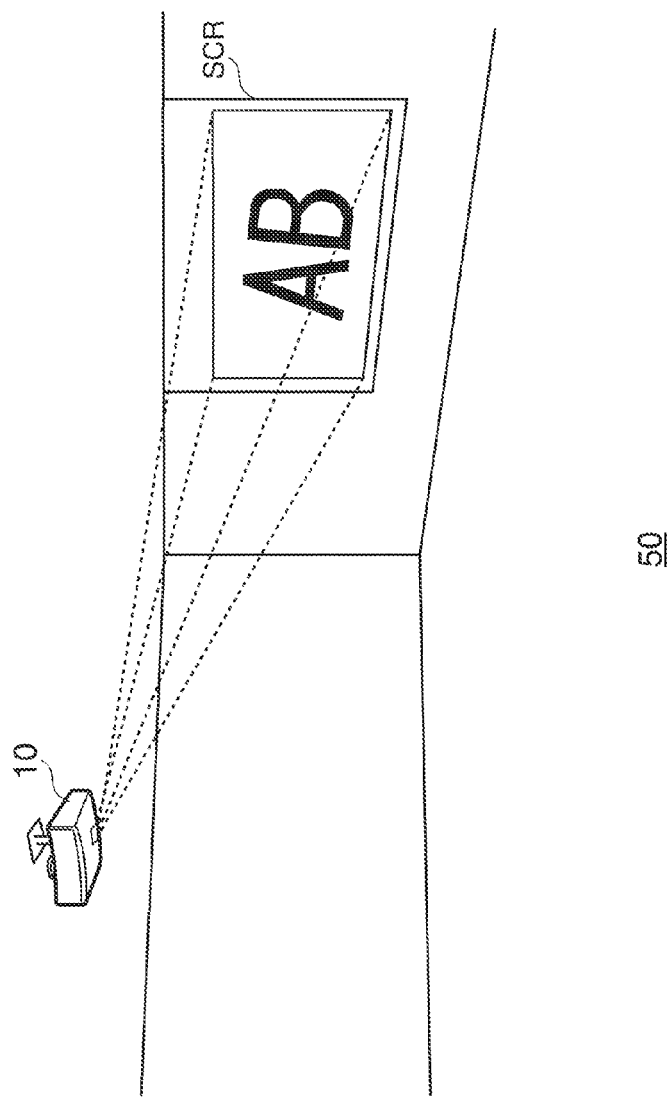
FIG. 6 is an explanatory diagram of the projector system in the embodiment, the projector system provided with the projector which is mounted on the ceiling.

In FIG. 6, an explanatory diagram of the projector system in this embodiment, the projector system provided with the projector 10 which is mounted on the ceiling, is shown.

A bottom face of the main body of the projector 10 is fixed to the ceiling when the projector 10 is mounted on the ceiling. Therefore, by setting the installation mode at the ceiling-mount mode, the projector 10 performs control to display a picture by rotating the picture 180 degrees. As described above, the projector 10 performs control by which the display method is switched in accordance with the set installation mode.

Incidentally, the apparatus connection connector 18 is provided in the projector 10 as shown in FIG. 3. Therefore, in a state in which the projector 10 is mounted on the ceiling, the portable information apparatus 30 is connected to the apparatus connection connector 18 of the projector 10 from below, and the weight of the portable information apparatus 30 is supported only by the holding power of the apparatus connection connector 18. When the holding power of the apparatus connection connector 18 is greater than the weight of the portable information apparatus 30, although the portable information apparatus 30 is held, contact between the apparatus connection connector 18 and the output terminal of the portable information apparatus 30 tends to be insufficient. Moreover, the portable information apparatus 30 may fall due to the influence of vibration, for example. On the other hand, when the holding power of the apparatus connection connector 18 is smaller than the weight of the portable information apparatus 30, the portable information apparatus 30 falls.

As described above, in a state in which the projector 10 is mounted on the ceiling, it is preferable not to permit the connection of the portable information apparatus 30 to the projector 10 and preferable to take measures to prevent the user from connecting the portable information apparatus 30 to the projector 10 by mistake. Therefore, in this embodiment, when the ceiling-mount mode is set as the installation mode, the projector 10 puts a restriction on the function of using the apparatus connection connector 18.

Figure 7:
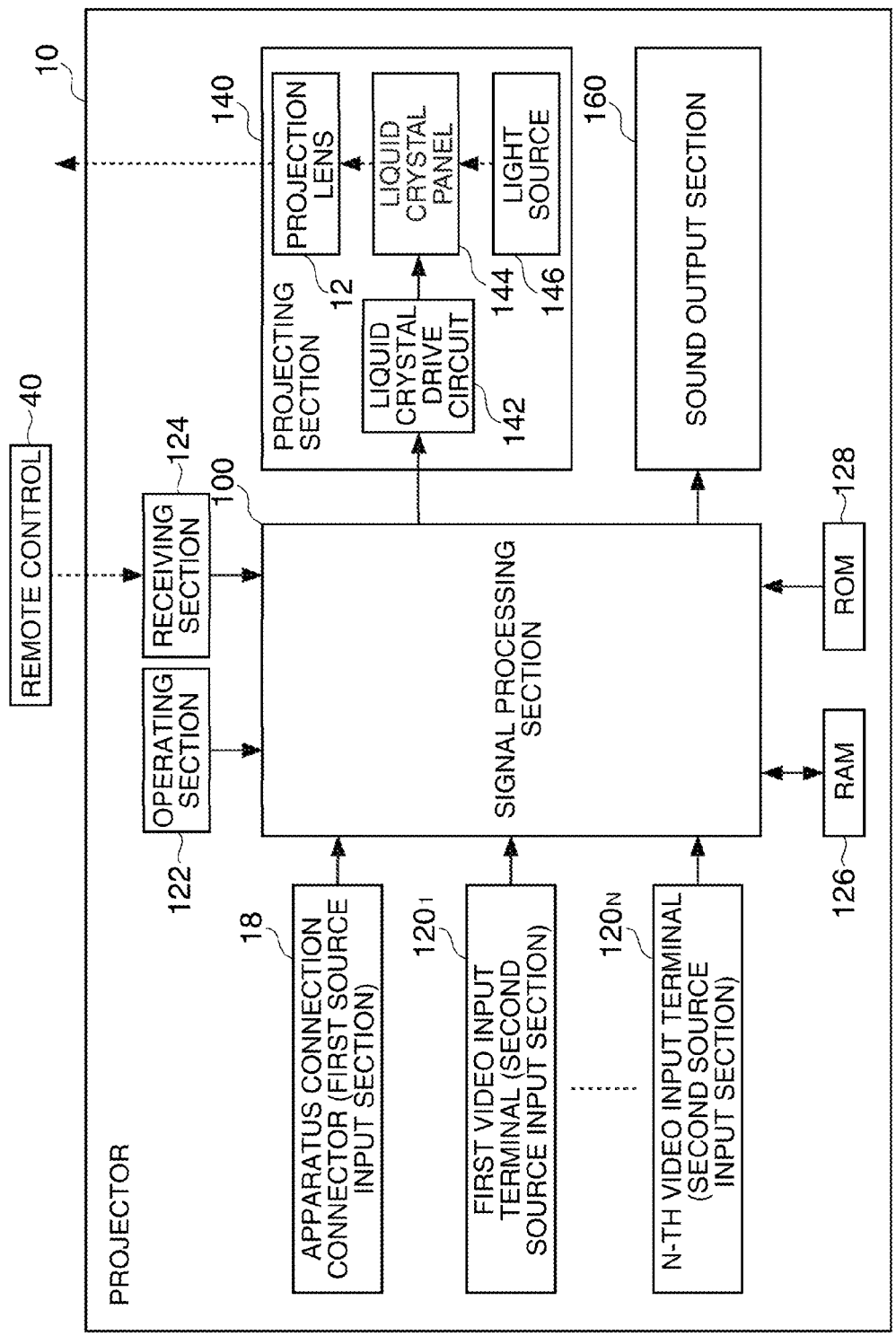
FIG. 7 is a functional block diagram of a configuration example of the projector in the embodiment.

In FIG. 7, a functional block diagram of a configuration example of the projector 10 in this embodiment is shown. In FIG. 7, such portions as are similar to those in FIG. 1 or 5 are identified with the same reference characters and their descriptions will be omitted as appropriate. Incidentally, in FIG. 7, the video input terminal includes as appropriate a sound input terminal to which a sound signal synchronized with a video signal is input. Moreover, in FIG. 7, for simplification of the description, the zoom ring 14, the dock connector 16, and the like are not shown.

The projector 10 includes a signal processing section 100, an operating section 122, a receiving section 124, random access memory (RAM) 126, and read only memory (ROM) 128. Moreover, the projector 10 includes the apparatus connection connector 18 as a first source input section, first to N-th video input terminals $120_1$ to $120_N$ (N is an integer) as one or a plurality of second source input sections, a projecting section 140, and a sound output section 160. The projecting section 140 includes a liquid crystal drive circuit 142, a liquid crystal panel 144, a light source 146, and the projection lens 12.

In the embodiment described below, for convenience of explanation, it is assumed that N is "6". In this case, the first video input terminal $120_1$ is, for example, a computer input terminal and a sound input terminal (hereinafter appropriately abbreviated as a computer input terminal etc.), and, to the first video input terminal $120_1$, a computer video signal, a sound signal, and a component video signal of a video device are input. The second video input terminal $120_2$ is, for example, an S-video input terminal, and, to the second video input terminal $120_2$, an S-video signal of the video device is input. The third video input terminal $120_3$ is, for example, a video input terminal and a sound input terminal (hereinafter appropriately abbreviated as a video input terminal etc.), and to the third video input terminal $120_3$, a composite video signal and a sound signal of the video device are input. The fourth video input terminal $120_4$ is, for example, an HDMI (High-Definition Multimedia Interface) input terminal, and, to the fourth video input terminal $120_4$, a signal of an HDMI-capable video device or an HDMI-capable computer is input. The fifth video input terminal $120_5$ is, for example, a type B terminal of USB (Universal Serial Bus), and to the fifth video input terminal $120_5$, a video signal etc. of a computer is input via a USB cable. The sixth video input terminal $120_6$ is, for example, a USB terminal, and, to the sixth video input terminal $120_6$, a video signal etc. of a USB storage, a digital camera, or the like is input via a USB cable.

The operating section 122 is formed of an operation panel, for example, accepts the operation performed by the user, and outputs operation information corresponding to the operation performed by the user to the signal processing section 100. The receiving section 124 receives the operation information corresponding to the operation performed by the user by using the remote control 40, and outputs the received operation information to the signal processing section 100.

Based on the operation information from the operating section 122 or the receiving section 124, the signal processing section 100 performs control to switch the video signal to any one of the video signals of the apparatus connection connector 18 and the first to sixth video input terminals $120_1$ to $120_6$. Then, the signal processing section 100 performs given signal processing on the switched video signal from the apparatus connection connector 18 or the video input terminal and outputs, to the projecting section 140, the video signal on which the signal processing has been performed. Similarly, the signal processing section 100 outputs, to the sound output section 160, the sound signal from any one of the apparatus connection connector 18 and the first to sixth video input terminals $120_1$ to $120_6$ in synchronization with the above-described video signal. The signal processing performed by the signal processing section 100 includes resizing processing, image quality adjustment processing, OSD (on screen display) menu generation processing, and the like. Such a signal processing section 100 includes a central processing unit (hereinafter a CPU) and implements part or all of the above-described signal processing and the like by software processing. At this time, the CPU of the signal processing section 100 reads a program product which is previously stored in the ROM 128 and performs processing corresponding to the program product while using the RAM 126 as a work area, and thereby implements part or all of the above-described signal processing and the like.

In the projecting section 140, the liquid crystal drive circuit 142 drives the liquid crystal panel 144 based on the video signal on which the signal processing has been performed by the signal processing section 100. The liquid crystal panel 144 is illuminated with light from the light source 146, and the projecting section 140 performs projection onto the screen by the projection lens 12 by using the modulated light modulated by the liquid crystal panel 144.

The sound output section 160 is disposed on the back 22 of the main body of the projector 10 shown in FIG. 2, for example. By doing so, it is possible to perform sound output without blocking the picture projected by the projection lens 12 while operating the operating screen 34 of the portable information apparatus 30 in a state in which the portable information apparatus 30 is connected to the apparatus connection connector 18.

Figure 8:
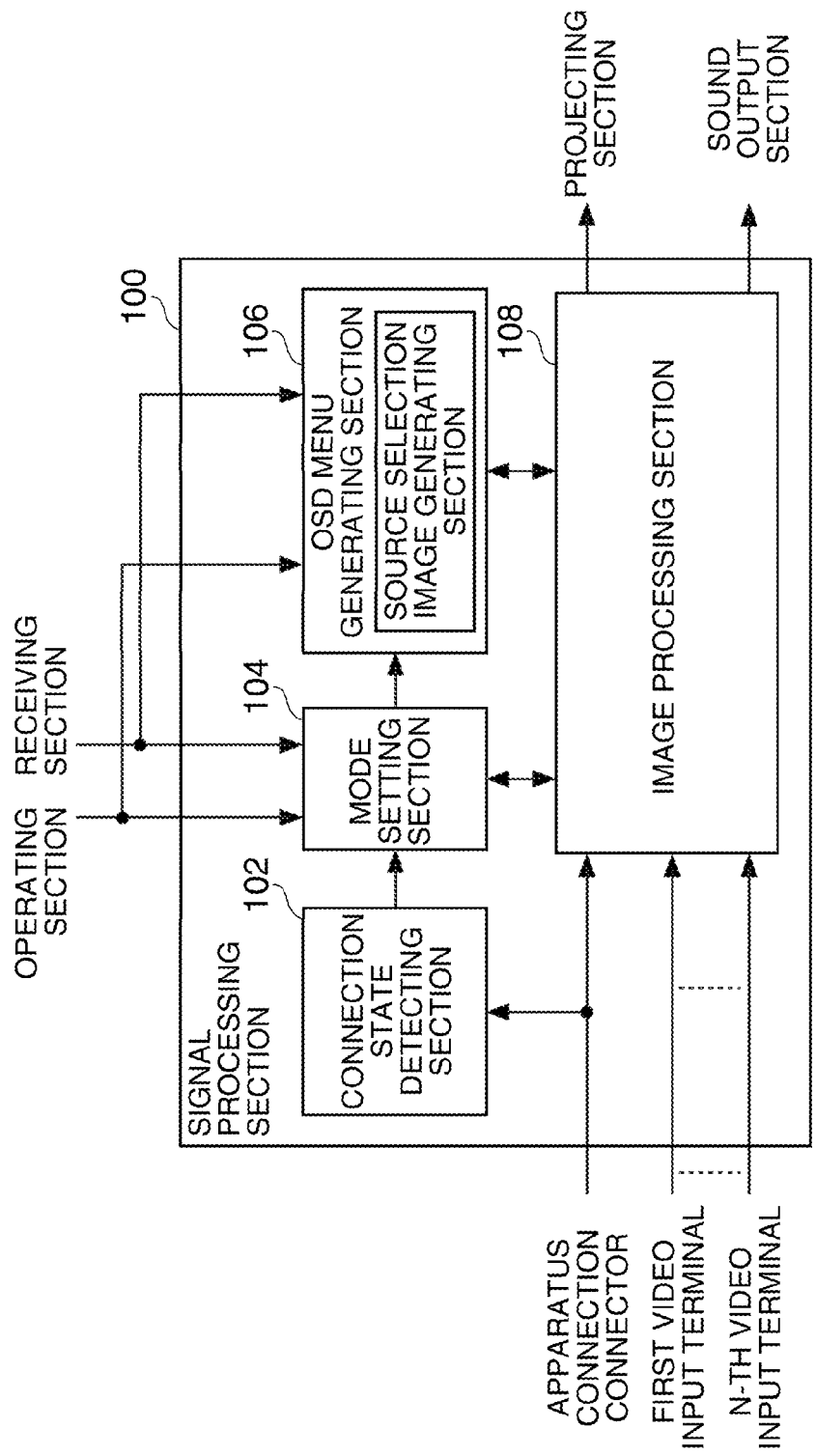
FIG. 8 is a functional block diagram of a configuration example of a signal processing section of FIG. 7.

In FIG. 8, a functional block diagram of a configuration example of the signal processing section 100 of FIG. 7 is shown. In FIG. 8, such portions as are similar to those in FIG. 7 are identified with the same reference characters and their descriptions will be omitted as appropriate.

The signal processing section 100 includes a connection state detecting section 102, a mode setting section 104, an OSD menu generating section 106, and an image processing section 108. The OSD menu generating section 106 includes a source selection image generating section 110. The connection state detecting section 102 detects a connection state of the apparatus connection connector 18. The mode setting section 104 is informed of the connection state detection result obtained by the connection state detecting section 102. Based on the operation information from the operating section 122 or the receiving section 124, the mode setting section 104 sets the installation mode (in a broad sense, the projection mode) of the projector 10. In this embodiment, it is assumed that the mode setting section 104 sets a floor-standing mode or a ceiling-mount mode. The OSD menu generating section 106 and the image processing section 108 are informed of the setting result in the mode setting section 104 described above, and generation of an OSD menu, image processing, and the like in accordance with the installation mode are performed.

The OSD menu generating section 106 generates an OSD menu image for displaying an OSD menu. The OSD menu generating section 106 generates the OSD menu image by appropriately reflecting the operation information from the operating section 122 or the receiving section 124. The source selection image generating section 110 generates a source selection image as one of the OSD menu images for making the user select the source of the video signal etc.

Based on the operation information from the operating section 122 or the receiving section 124, the image processing section 108 switches the video signal etc. to a video signal etc. of any one of the apparatus connection connector 18 and the first to sixth video input terminals $120_1$ to $120_6$. Then, the image processing section 108 performs given signal processing on the switched video signal from the video input terminal, outputs, to the projecting section 140, the video signal on which the signal processing has been performed, and outputs a sound signal synchronized with the video signal to the sound output section 160.

When the floor-standing mode (the first projection mode) is set by the mode setting section 104, the image processing section 108 outputs, to the projecting section 140, the video signal input via any one of the apparatus connection connector 18 and the first to sixth video input terminals $120_1$ to $120_6$. Moreover, when the floor-standing mode is set by the mode setting section 104, the image processing section 108 outputs, to the sound output section 160, the sound signal input via any one of the apparatus connection connector 18 and the first to sixth video input terminals $120_1$ to $120_6$.

On the other hand, when the ceiling-mount mode (the second projection mode) is set by the mode setting section 104, the image processing section 108 outputs, to the projecting section 140, the video signal input via any one of the first to sixth video input terminals $120_1$ to $120_6$, excluding the apparatus connection connector 18. At this time, the image processing section 108 outputs, to the projecting section 140, the video signal of a picture rotated 180 degrees. Moreover, when the ceiling-mount mode is set by the mode setting section 104, the image processing section 108 outputs, to the sound output section 160, the sound signal input via any one of the first to sixth video input terminals $120_1$ to $120_6$, excluding the apparatus connection connector 18.

Therefore, when the projector 10 is set in the floor-standing mode, the projector 10 can perform image display or sound output based on the video signal etc. from the portable information apparatus 30 connected to the projector 10 via the apparatus connection connector 18. On the other hand, when the projector 10 is set in the ceiling-mount mode, the projector 10 cannot perform image display etc. based on the video signal etc. from the portable information apparatus 30 connected to the projector 10 via the apparatus connection connector 18. That is, when the projector 10 is set in the ceiling-mount mode, the projector 10 makes it impossible to use a predetermined function using the apparatus connection connector 18.

Therefore, in this embodiment, when the ceiling-mount mode is set at the time of display of a source selection image for making the user select a source, a source selection image in which the portable information apparatus 30 that is connected to the apparatus connection connector 18 is removed from the source selection options is displayed. That is, when the floor-standing mode is set by the mode setting section 104, the source selection image generating section 110 generates a source selection image displaying information corresponding to a connector or a video input terminal (a source input section) to which the source is connected, the connector or the video input terminal of the apparatus connection connector 18 and the first to sixth video input terminals $120_1$ to $120_6$. Moreover, when the ceiling-mount mode is set by the mode setting section 104, the source selection image generating section 110 generates a source selection image displaying information corresponding to a video input terminal to which the source is connected, the video input terminal of the first to sixth video input terminals $120_1$ to $120_6$, excluding the apparatus connection connector 18.

By doing so, the user cannot select the portable information apparatus 30 as a source, making it possible to circumvent a situation in which the portable information apparatus 30 is connected to the apparatus connection connector 18 in a state in which the projector 10 is mounted on the ceiling.

In FIG. 8, the functions of the connection state detecting section 102, the mode setting section 104, and the OSD menu generating section 106 can be implemented by software processing, for example. The function of the image processing section 108 can be implemented by, for example, hardware such as an image processing circuit.

Hereinafter, a detailed operation example of the projector 10 in this embodiment will be described. In the projector 10, when source switching operation is performed by the user's operation information from the operating section 122 or the receiving section 124, a source selection image is generated, and the source selection image thus generated is displayed.

Figure 9:
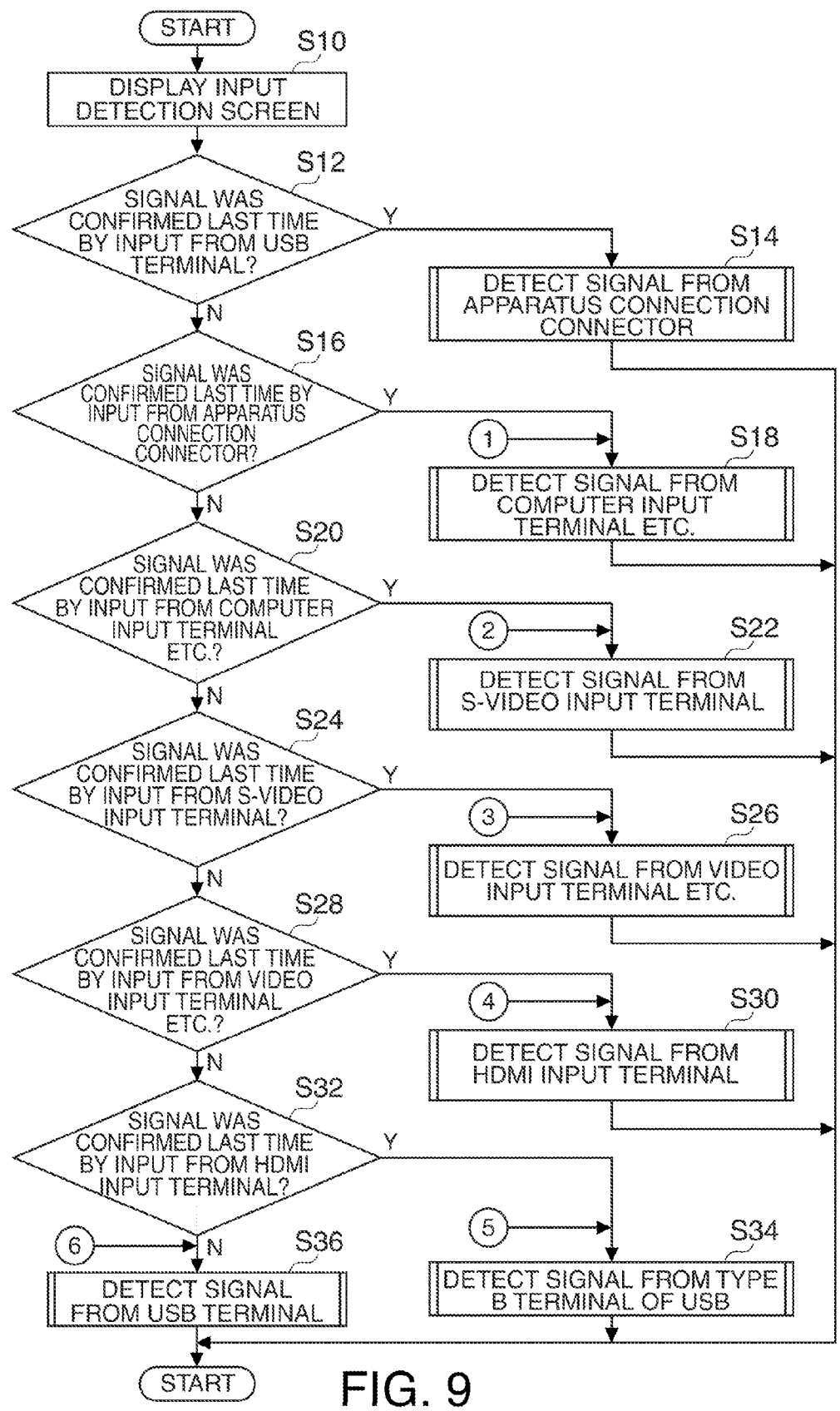
FIG. 9 is a flow diagram of a processing example of source switching processing in the signal processing section.

In FIG. 9, a flow diagram of a processing example of the source switching processing in the signal processing section 100 is shown. FIG. 9 shows an example of processing performed when the source switching operation is performed based on the user's operation information. Incidentally, in source switching performed by the user, detection of an input of a source is performed in a previously determined order, and, when an input is detected, a picture or the like from the detected source is output, and the switching operation is temporarily ended. The source selected by this switching operation is referred to at the start of the next source switching operation, and detection of an input from the next source following the source which was selected last time is started. Therefore, the user switches the source to an intended source by performing the source switching operation more than once as needed. Here, it is assumed that, as an initial value, an input from the USB terminal which is the sixth video input terminal $120_6$ was selected last time as a source (signal confirmation processing was performed on an input from the USB terminal which is the sixth video input terminal $120_6$ last time).

When the source switching operation is performed by the user, the source selection image generating section 110 generates a previously set source selection image for the first to sixth video input terminals $120_1$ to $120_6$ and makes the projecting section 140 display the source selection image (step S10). Then, the signal processing section 100 determines whether or not signal confirmation processing was performed on the input from the USB terminal (the sixth video input terminal $120_6$) last time (step S12). If signal confirmation processing was performed on the input from the USB terminal last time (step S12: Y), the signal processing section 100 (the image processing section 108) performs signal detection processing to detect a signal from the apparatus connection connector 18 (step S14). Then, the signal processing section 100 ends a series of processing (END).

If signal confirmation processing was not performed on the input from the USB terminal last time (step S12: N), the signal processing section 100 determines whether or not signal confirmation processing was performed on the input from the apparatus connection connector 18 last time (step S16). If signal confirmation processing was performed on the input from the apparatus connection connector 18 last time (step S16: Y), the signal processing section 100 (the image processing section 108) performs signal detection processing to detect a signal from the computer input terminal etc. (the first video input terminal $120_1$) (step S18). Then, the signal processing section 100 ends a series of processing (END).

If signal confirmation processing was not performed on the input from the apparatus connection connector 18 last time (step S16: N), the signal processing section 100 determines whether or not signal confirmation processing was performed on the input from the computer input terminal etc. last time (step S20). If signal confirmation processing was performed on the input from the computer input terminal etc. last time (step S20: Y), the signal processing section 100 (the image processing section 108) performs signal detection processing to detect a signal from the S-video input terminal (the second video input terminal $120_2$) (step S22). Then, the signal processing section 100 ends a series of processing (END).

If signal confirmation processing was not performed on the input from the computer input terminal etc. last time (step S20: N), the signal processing section 100 determines whether or not signal confirmation processing was performed on the input from the S-video input terminal last time (step S24). If signal confirmation processing was performed on the input from the S-video input terminal last time (step S24: Y), the signal processing section 100 (the image processing section 108) performs signal detection processing to detect a signal from the video input terminal etc. (the third video input terminal 120$_3$) (step S26). Then, the signal processing section 100 ends a series of processing (END).

If signal confirmation processing was not performed on the input from the S-video input terminal last time (step S24: N), the signal processing section 100 determines whether or not signal confirmation processing was performed on the input from the video input terminal etc. last time (step S28). If signal confirmation processing was performed on the input from the video input terminal etc. last time (step S28: Y), the signal processing section 100 (the image processing section 108) performs signal detection processing to detect a signal from the HDMI input terminal (the fourth video input terminal 120$_4$) (step S30). Then, the signal processing section 100 ends a series of processing (END).

If signal confirmation processing was not performed on the input from the video input terminal etc. last time (step S28: N), the signal processing section 100 determines whether or not signal confirmation processing was performed on the input from the HDMI input terminal last time (step S32). If signal confirmation processing was performed on the input from the HDMI input terminal last time (step S32: Y), the signal processing section 100 (the image processing section 108) performs signal detection processing to detect a signal from the type B terminal (the fifth video input terminal 120$_5$) of the USB (step S34). Then, the signal processing section 100 ends a series of processing (END). If signal confirmation processing was not performed on the input from the HDMI input terminal last time (step S32: N), the signal processing section 100 performs signal detection processing to detect a signal from the USB terminal (step S36) and ends a series of processing (END).

Figure 10:
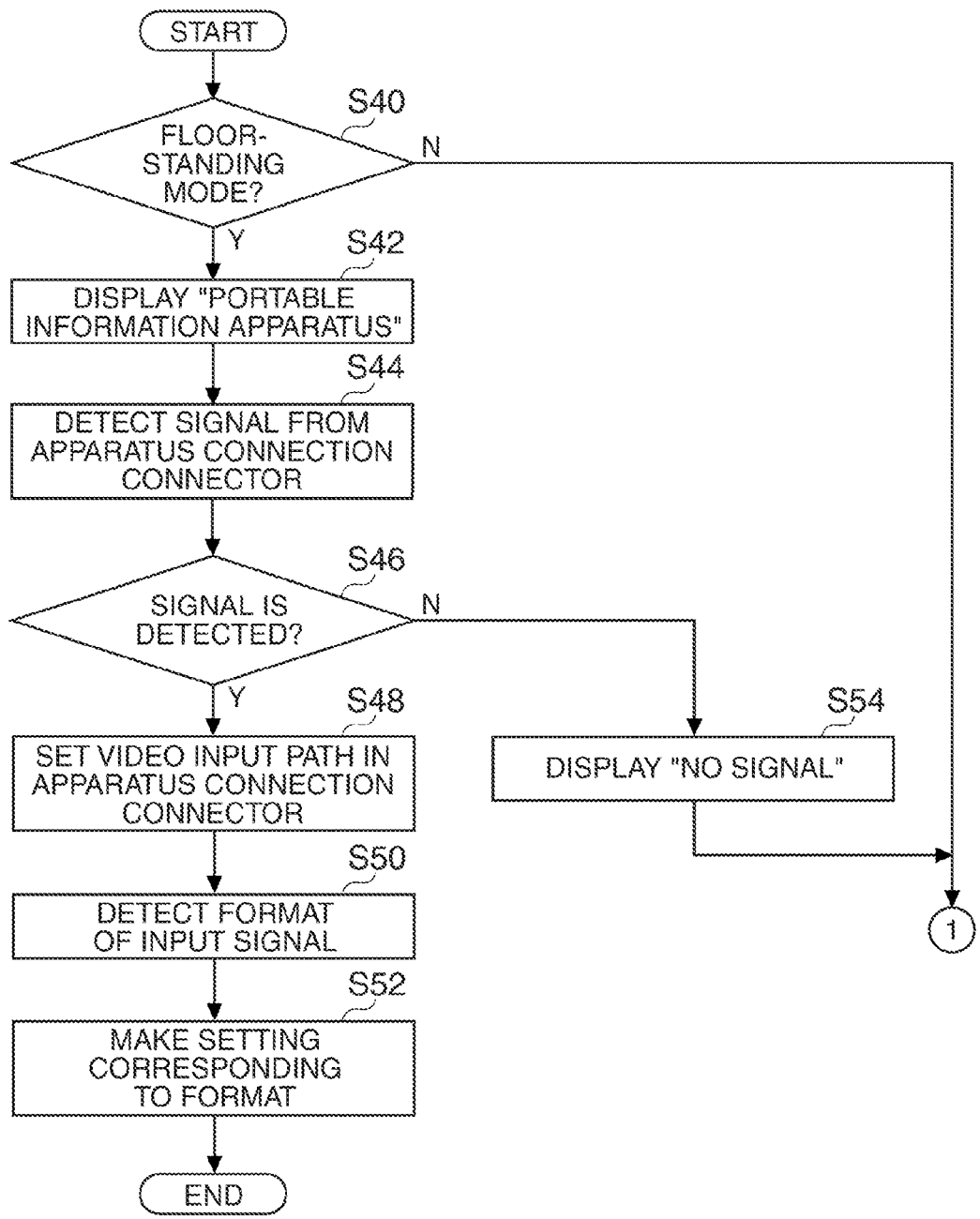
FIG. 10 is a flow diagram of a processing example of signal confirmation processing in step S14 of FIG. 9.

In FIG. 10, a flow diagram of a processing example of the signal confirmation processing in step S14 of FIG. 9 is shown.

In step S14 of FIG. 9, the source selection image generating section 110 determines whether or not the floor-standing mode is set by the mode setting section 104 (step S40). If the floor-standing mode is set (step S40: Y), the source selection image generating section 110 generates a source selection image in which "portable information apparatus" is additionally displayed in a predetermined position (step S42) and makes the projecting section 140 display the source selection image.

Then, the image processing section 108 detects a signal from the apparatus connection connector 18 (step S44). If a signal indicating that the portable information apparatus 30 is connected to the apparatus connection connector 18 is detected (step S46: Y), the image processing section 108 sets a video input path in the apparatus connection connector 18 (step S48). Then, the image processing section 108 detects a format of the input signal from the apparatus connection connector 18 (step S50), makes the setting (for example, the setting of the enlargement ratio of a picture) corresponding to the format thus detected (step S52), and ends a series of processing (END).

If a signal indicating that the portable information apparatus 30 is connected to the apparatus connection connector 18 is not detected in step S46 (step S46: N), the source selection image generating section 110 generates a source selection image displaying "no signal" corresponding to "portable information apparatus" (step S54).

If the ceiling-mount mode is set by the mode setting section 104 (step S40: N) or after step S54, the image processing section 108 proceeds to step S18 of FIG. 9.

Figure 11:
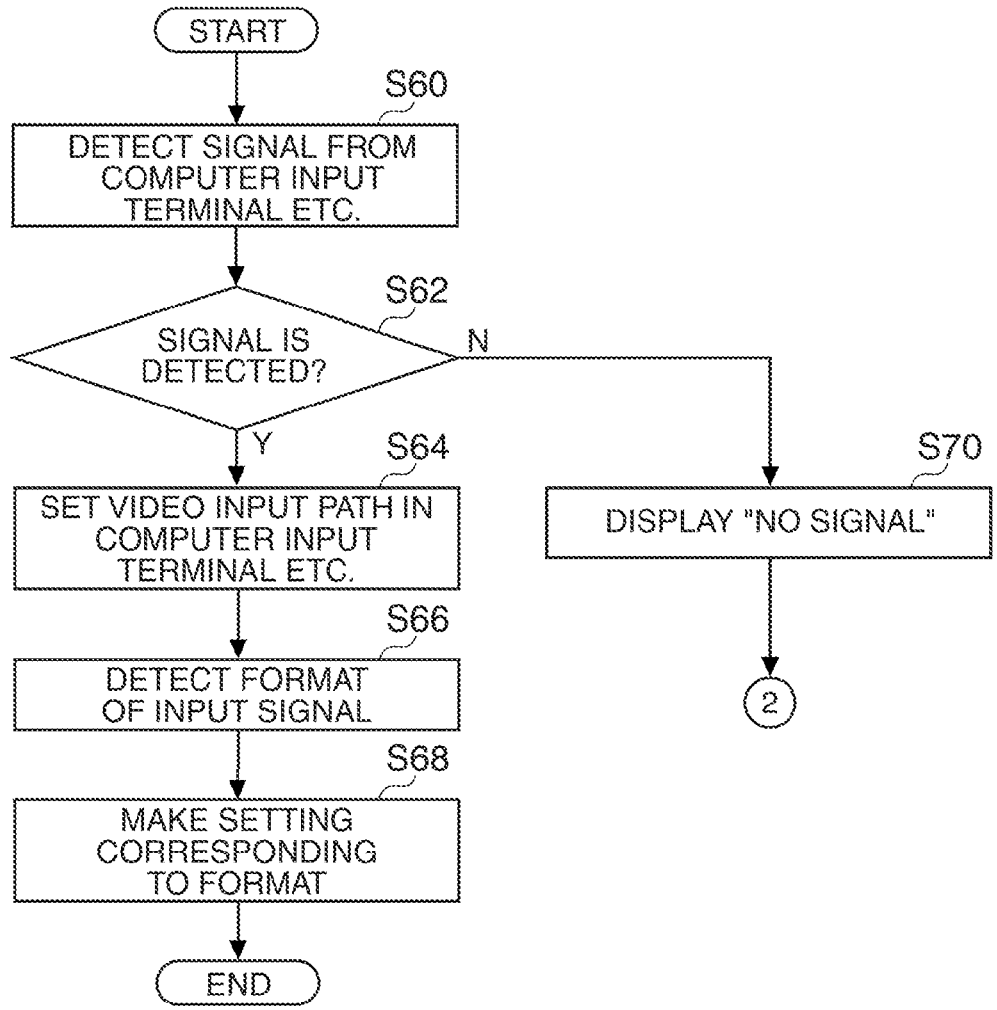
FIG. 11 is a flow diagram of a processing example of signal confirmation processing in step S18 of FIG. 9.

In FIG. 11, a flow diagram of a processing example of the signal confirmation processing in step S18 of FIG. 9 is shown.

In step S18 of FIG. 9, the image processing section 108 first detects a signal from the computer input terminal etc. (the first video input terminal 120$_1$) (step S60). If a video signal etc. from the computer input terminal etc. is detected (step S62: Y), the image processing section 108 sets a video input path in the computer input terminal etc. (step S64). Then, the image processing section 108 detects a format of the input signal from the computer input terminal etc. (step S66), makes the setting (for example, the setting of the enlargement ratio of a picture) corresponding to the format thus detected (step S68), and ends a series of processing (END).

If a video signal etc. from the computer input terminal etc. is not detected in step S62 (step S62: N), the source selection image generating section 110 generates a source selection image displaying "no signal" corresponding to the computer input terminal etc. (step S70). Then, the image processing section 108 proceeds to step S22 of FIG. 9.

Steps S22, S26, S30, and S34 of FIG. 9 are the same as the processing in step S18 described in FIG. 11. That is, step S22 of FIG. 9 is the same as the processing in which the wording "the computer input terminal etc. (the first video input terminal 120$_1$)" in the description of FIG. 11 is replaced with "the S-video input terminal (the second video input terminal 120$_2$)". In this case, if a signal from the S-video input terminal is not detected, "no signal" is displayed, and the procedure proceeds to step S26 of FIG. 9.

Step S26 in FIG. 9 is the same as the processing in which the wording "the computer input terminal etc. (the first video input terminal 120$_1$)" in the description of FIG. 11 is replaced with "the video input terminal etc. (the third video input terminal 120$_3$)". In this case, if a signal from the video input terminal etc. is not detected, "no signal" is displayed, and the procedure proceeds to step S30 of FIG. 9.

Step S30 of FIG. 9 is the same as the processing in which the wording "the computer input terminal etc. (the first video input terminal 120$_1$)" in the description of FIG. 11 is replaced with "the HDMI input terminal (the fourth video input terminal 120$_4$)". In this case, if a signal from the HDMI input terminal is not detected, "no signal" is displayed, and the procedure proceeds to step S34 of FIG. 9.

Step S34 of FIG. 9 is the same as the processing in which the wording "the computer input terminal etc. (the first video input terminal 120$_1$)" in the description of FIG. 11 is replaced with "the type B terminal (the fifth video input terminal 120$_5$) of the USB". In this case, if a signal from the type B terminal of the USB is not detected, "no signal" is displayed, and the procedure proceeds to step S36 of FIG. 9.

Figure 12:
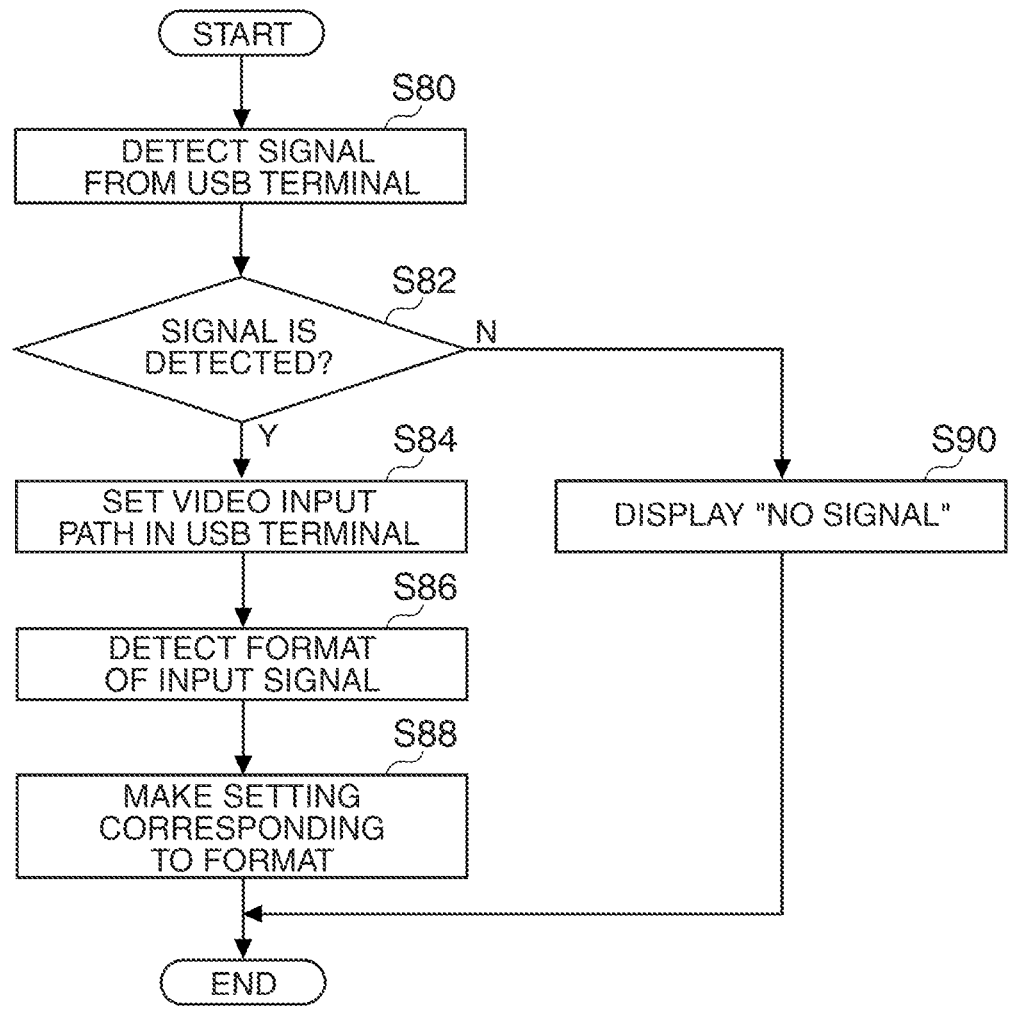
FIG. 12 is a flow diagram of a processing example of signal confirmation processing in step S36 of FIG. 9.

In FIG. 12, a flow diagram of a processing example of the signal confirmation processing in step S36 of FIG. 9 is shown.

In step S36 of FIG. 9, the image processing section 108 first detects a signal from the USB terminal (the sixth video input terminal 120$_6$) (step S80). If a video signal etc. from the USB terminal is detected (step S82: Y), the image processing section 108 sets a video input path in the USB terminal (step S84). Then, the image processing section 108 detects a format of the input signal from the USB terminal (step S86), makes the setting (for example, the setting of the enlargement ratio of a picture) corresponding to the format thus detected (step S88), and ends a series of processing (END).

If a video signal etc. from the USB terminal is not detected in step S82 (step S82: N), the source selection image generating section 110 generates a source selection image displaying "no signal" corresponding to the USB terminal (step S90). Then, the image processing section 108 ends a series of processing (END).

By performing processing as described above, when the floor-standing mode is set as the installation mode, the portable information apparatus 30 is displayed as a switching option for the user, and the user is allowed to use the function of the portable information apparatus 30.

Figure 13:
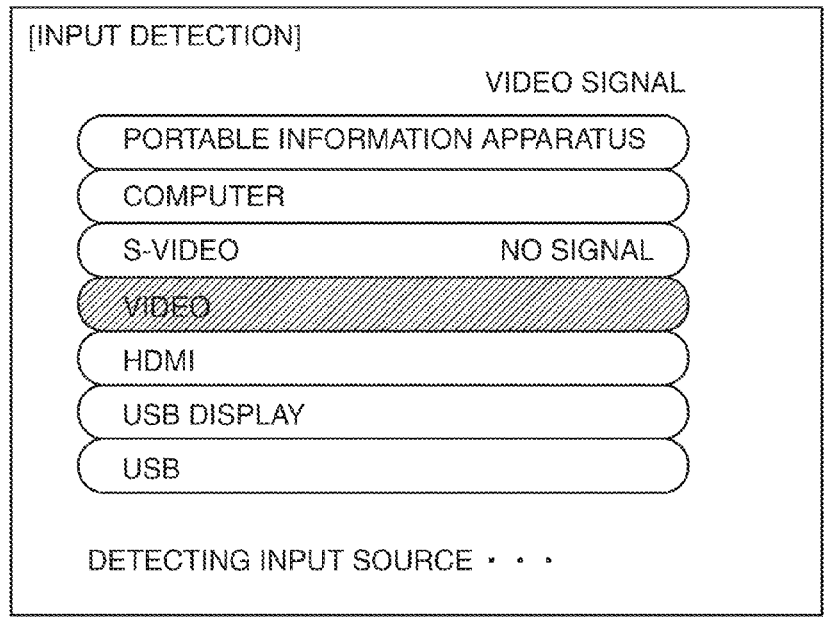
FIG. 13 is a diagram showing an example of a source selection image when a floor-standing mode is set as the installation mode.

In FIG. 13, an example of the source selection image when the floor-standing mode is set as the installation mode is shown.

When source switching operation is performed by the user, the source selection image generated by the source selection image generating section 110 is projected onto the screen by the projecting section 140. When the floor-standing mode is set as the installation mode, every time the source switching operation is performed, detection of an input from the apparatus connection connector 18 and the first to sixth video input terminals $120_1$ to $120_6$ is performed in turn. Then, the source is switched to the source whose input signal has been detected, and a picture from the source is displayed on the screen. In FIG. 13, a signal from the second video input terminal $120_2$ which is the S-video terminal is not detected, and a signal from the third video input terminal $120_3$ which is a video terminal is detected. The user can perform video output (image output) or sound output by selecting, as a source, the portable information apparatus 30 connected to the apparatus connection connector 18 by repeating the source switching operation and using the video signal etc. from the portable information apparatus 30.

On the other hand, when the ceiling-mount mode is set as the installation mode, the switching options for the user, the switching options from which the portable information apparatus 30 is removed, are displayed, making it impossible for the user to use the function of the portable information apparatus 30.

Figure 14:
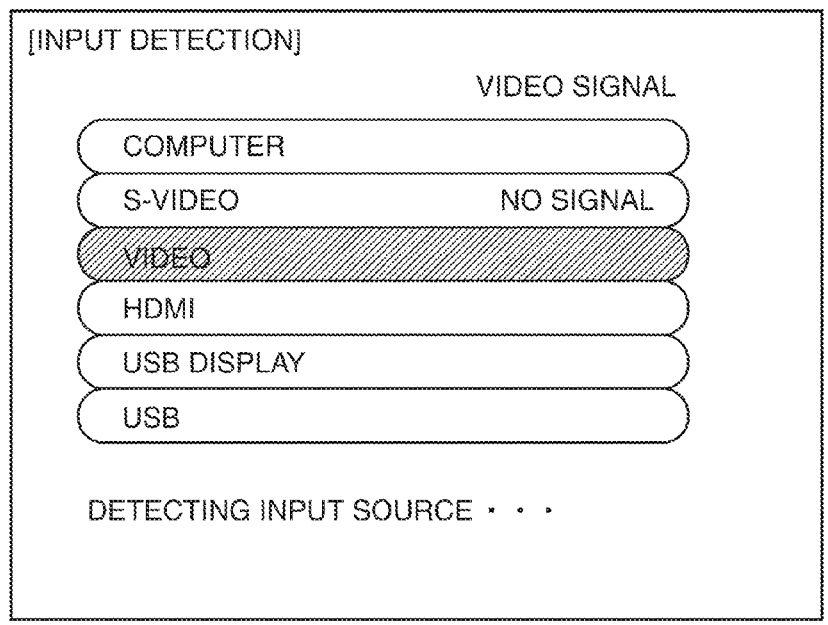
FIG. 14 is a diagram showing an example of the source selection image when a ceiling-mount mode is set as the installation mode.

In FIG. 14, an example of the source selection image when the ceiling-mount mode is set as the installation mode is shown.

When the ceiling-mount mode is set as the installation mode, every time the source switching operation is performed, detection of an input from the first to sixth video input terminals $120_2$ to $120_6$, excluding the apparatus connection connector 18, is performed in turn. Then, the source is switched to the source whose input signal has been detected, and a picture from the source is displayed on the screen. In FIG. 14, a signal from the second video input terminal $120_2$ which is the S-video terminal is not detected, and a signal from the third video input terminal $120_3$ which is a video terminal is detected. However, the source selection image is displayed, excluding the portable information apparatus which is connected to the apparatus connection connector 18 from the source selection options. As a result, even when the user repeats the source switching operation, although the user can select any one of the first to sixth video input terminals $120_1$ to $120_6$ as a source, the user cannot select, as a source, the portable information apparatus 30 which is connected to the apparatus connection connector 18. Therefore, the user cannot select the portable information apparatus 30 as a source, making it possible to circumvent a situation in which the portable information apparatus 30 is connected to the apparatus connection connector 18 in a state in which the projector 10 is mounted on the ceiling.

Moreover, in this embodiment, control is performed so that the installation mode is not switched in a state in which the portable information apparatus 30 is connected to the apparatus connection connector 18. Specifically, when the connection state detecting section 102 detects that the portable information apparatus 30 is connected to the apparatus connection connector 18, the projector 10 prohibits or disables switching to the ceiling-mount mode by the mode setting section 104. This prevents a contradiction between the connection state of the apparatus connection connector 18 and the installation mode.

Figure 15:
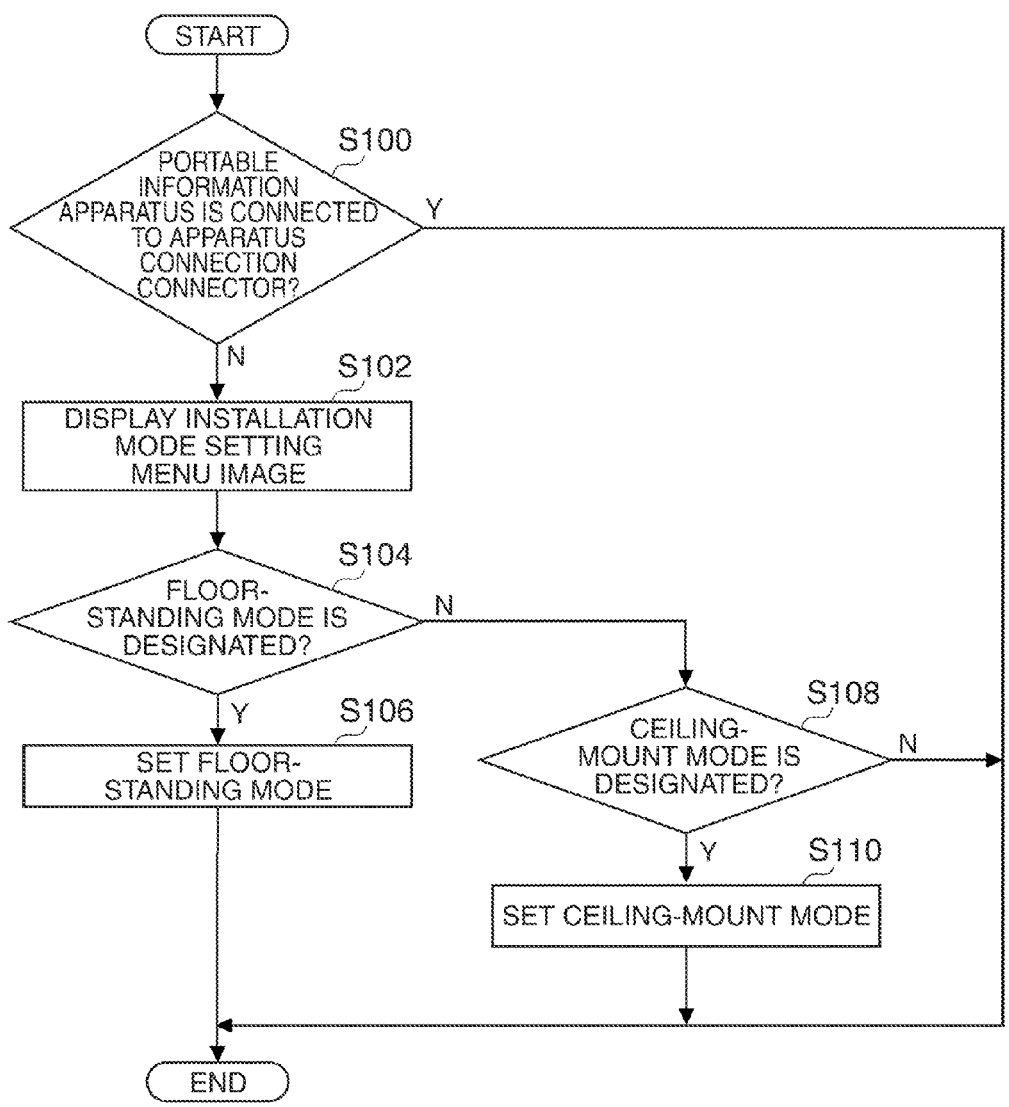
FIG. 15 is a flow diagram of a processing example of mode setting processing in the signal processing section.

In FIG. 15, a flow diagram of a processing example of mode setting processing in the signal processing section 100 is shown. FIG. 15 shows an example of processing performed when mode setting operation is performed based on the user's operation information. Incidentally, in FIG. 15, a description will be given on the assumption that there are two types of installation modes: a floor-standing mode and a ceiling-mount mode.

When a predetermined mode setting operation is performed by the user, the connection state detecting section 102 determines whether or not the portable information apparatus 30 is connected to the apparatus connection connector 18 (step S100). The connection state detecting section 102 can determine whether or not the portable information apparatus 30 is connected to the apparatus connection connector 18 by monitoring the control signal of the apparatus connection connector 18. If the portable information apparatus 30 is not connected to the apparatus connection connector 18 (step S100: N), the OSD menu generating section 106 generates an installation mode setting menu image and makes the projecting section 140 display the installation mode setting menu image (step S102).

Next, the mode setting section 104 determines whether or not a floor-standing mode is designated (set) as the installation mode based on the user's operation information from the operating section 122 or the receiving section 124 (step S104). If the floor-standing mode is designated as the installation mode (step S104: Y), the mode setting section 104 sets the floor-standing mode as the installation mode (step S106), and the signal processing section 100 ends a series of processing (END).

If the floor-standing mode is not designated as the installation mode in step S104 (step S104: N), the mode setting section 104 determines whether or not a ceiling-mount mode is designated (set) as the installation mode based on the user's operation information (step S108). If the ceiling-mount mode is designated as the installation mode (step S108: Y), the mode setting section 104 sets the ceiling-mount mode as the installation mode (step S110), and the signal processing section 100 ends a series of processing (END). If the ceiling-mount mode is not designated as the installation mode (step S108: N), the signal processing section 100 ends a series of processing (END).

Moreover, if the portable information apparatus 30 is connected to the apparatus connection connector 18 in step S100 (step S100: Y), the signal processing section 100 ends a series of processing (END).

As described above, it is detected whether or not the portable information apparatus 30 is connected to the apparatus connection connector 18, and an installation mode setting image is not displayed when the portable information apparatus 30 is connected to the apparatus connection connector 18. This makes it possible to circumvent a situation in which the installation mode is switched to the ceiling-mount mode while the user is using the portable information apparatus 30.

Moreover, in this embodiment, it is possible to operate the portable information apparatus 30 by the remote control 40 of the projector 10. This makes it possible to select a picture to be stored in the portable information apparatus 30 and perform fast-forwarding, playback, temporary pause, fast-rewinding or the like as control of video replay and sound reproduction by operating the remote control 40 and thereby increase user convenience. Also in this case, it is preferable that the user's operation information input by the remote control 40 be disabled when the ceiling-mount mode is set as the installation mode.

Figure 16:
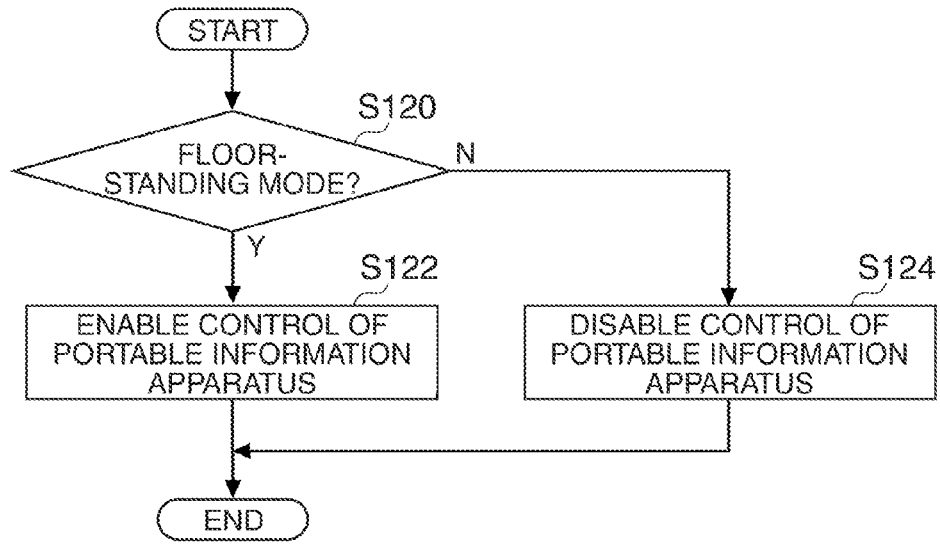
FIG. 16 is a flow diagram of a processing example of remote control operation processing in the signal processing section.

In FIG. 16, a flow diagram of a processing example of operation processing of the remote control 40 in the signal processing section 100 is shown. FIG. 16 shows an example of processing performed when control start operation of the portable information apparatus 30 is performed by using the remote control 40 based on the user's operation information. Incidentally, in FIG. 16, a description will be given on the assumption that there are two types of installation modes: a floor-standing mode and a ceiling-mount mode.

When control start operation of the portable information apparatus 30 which is performed by using the remote control 40 is performed by the user, the signal processing section 100 determines the installation mode (step S120). If a floor-standing mode is set as the installation mode (step S120: Y), the signal processing section 100 enables the operation information of the receiving section 124 that has received the operation information from the remote control 40 and thereby enables control of the portable information apparatus 30 (step S122). Then, the signal processing section 100 ends a series of processing (END).

If a ceiling-mount mode is set as the installation mode (step S120: N), the signal processing section 100 disables the operation information of the receiving section 124 that has received the operation information from the remote control 40 and thereby disables control of the portable information apparatus 30 (step S124). Then, the signal processing section 100 ends a series of processing (END).

As described above, when the ceiling-mount mode is set as the installation mode, control of the portable information apparatus 30 by using the remote control 40 is disabled. This makes it possible to present specifications in which the portable information apparatus 30 cannot be connected to the projector 10 which is mounted on the ceiling.

While the projector according to the invention, the method for controlling the projector, and the like have been described based on the above embodiment, the invention is not limited to the embodiment described above. For example, the invention can be carried out in numerous ways without departing from the spirit of the invention and can be modified as follows.

(1) In the embodiment described above, a description has been given of a case where a change to the ceiling-mount mode is prohibited in accordance with the status of connection to the apparatus connection connector 18, but the invention is not limited thereto. For example, a change to the ceiling-mount mode may be prohibited when, for example, the input source is set at the portable information apparatus 30 and operation of the portable information apparatus 30 by using the remote control 40 of the projector 10 is enabled.

(2) In the embodiment described above, a description has been given of a case where a change of the installation mode to the ceiling-mount mode is prohibited when the portable information apparatus 30 is connected to the apparatus connection connector 18, but the invention is not limited thereto. A change itself of the installation mode may be prohibited when the portable information apparatus 30 is connected to the apparatus connection connector 18.

(3) The above embodiment has been described, taking up a liquid crystal projector as an example of the projector. However, display devices such as a projector using a transmissive liquid crystal panel or a reflective liquid crystal panel can be adopted. Moreover, the projector according to the invention may be a projector or the like using a digital micromirror device, for example.

(4) The above embodiment has been described, taking up an installation mode as an example of the projection mode according to the invention, but the invention is not limited thereto. The invention can be applied to an embodiment in which part of the function is restricted in accordance with the usage state of the projector, for example, irrespective of the installation state of the projector.

(5) The above embodiment has been described, taking up a floor-standing mode and a ceiling-mount mode as an example of the installation mode, but the invention is not limited thereto and an installation mode corresponding to other installation states of the projector may be included. Moreover, the embodiment is not limited to the wording "floor-standing" and the wording "ceiling-mount", and other wording indicating an installation state to that effect may be used.

(6) The portable information apparatus in the embodiment described above simply has to be an apparatus having a video output function or a sound output function. Moreover, the portable information apparatus in the embodiment described above may have the function of being connected to a network such as the Internet. As such a portable information apparatus in the embodiment described above, there are a mobile telephone, a smartphone, a PDA (personal data assistance), a portable music player, an electronic dictionary, an electronic organizer, a game machine, a portable personal computer, and the like.

(7) In the embodiment described above, the invention has been described as a projector, a method for controlling the projector, and the like, but the invention is not limited thereto and may be, for example, a method for generating a source selection image, a source selection method, and a mode setting method in the embodiment described above, a program product executing these methods, and a computer-readable information storage medium that stores the program product.

What is claimed is:

1. A projector comprising:
a first source input section;
a second source input section;
a mode setting section configured to set a projection mode; and
a dock connector in which an external device connecting section is provided, the dock connector being configured so that the dock connector can be pulled out in a given direction in which the dock connector is pulled,
wherein
the first source input section is the external device connecting section which is configured so that an external device having an output terminal can be connected to the external device connecting section,
the dock connector is configured so that, in a state in which the dock connector is pulled out in the given direction in which the dock connector is pulled, the external device can be connected thereto from a connection direction intersecting with the given direction in which the dock connector is pulled,
when a first projection mode is set by the mode setting section, image display or sound output is performed based on an input signal that is input via any one of the first source input section and the second source input section, and
when a second projection mode is set by the mode setting section, image display or sound output is performed based on an input signal that is input via the second source input section.

2. The projector according to claim 1, further comprising:
a source selection image generating section configured to generates a source selection image, wherein
the source selection image generating section generates a source selection image displaying information corresponding to a source input section of the first source input section and the second source input section in case that the first projection mode is set by the mode setting section, and the source selection image generating section generates a source selection image displaying information corresponding to the second source input section in case that the second projection mode is set by the mode setting section.

3. The projector according to claim 1, wherein
the mode setting section sets a mode corresponding to an installation state of a projector main body as the projection mode.

4. The projector according to claim 3, wherein
the first projection mode is a floor-standing mode, and
the second projection mode is a ceiling-mount mode.

5. The projector according to claim 1, further comprising:
a connection state detection section configured to detect whether or not the external device is connected to the external device connecting section,
wherein
setting the second projection mode by the mode setting section is prohibited or disabled in case that the external device is detected being connected to the external device connecting section.

6. The projector according to claim 1, further comprising:
a remote controller configured to control the projector remotely,
wherein
the remote controller controls the external device in case that the first projection mode is set by the mode setting section, and
control of the external device by the remote controller is disabled in case that the second projection mode is set by the mode setting section.

7. A method for controlling a projector including a first source input section, a second source input section, and a mode setting section that sets a projection mode, the method comprising:
performing image display or sound output based on an input signal that is input via any one of the first source input section and the second source input section when a first projection mode is set by the mode setting section,
performing image display or sound output based on an input signal that is input via the second source input section when a second projection mode is set by the mode setting section,
detecting whether or not an external device is connected to an external device connecting section which is the first input section and configured so that the external device having an output terminal can be connected to the external device connecting section, and
disabling or prohibiting setting the second projection mode by the mode setting section in case that the external device is detected being connected to the external device connecting section.

8. The method according to claim 7, further comprising:
generating a source selection image which displays information corresponding to a source input section of the first source input section and the second source input section in case that the first projection mode is set by the mode setting section, and
generating a source selection image which displays information corresponding to the second source input section in case that the second projection mode is set by the mode setting section.

9. The method according to claim 7, wherein
the mode setting section sets a mode corresponding to an installation state of a projector main body as the projection mode.

10. The method according to claim 9, wherein
the first projection mode is a floor-standing mode, and
the second projection mode is a ceiling-mount mode.

11. The method according to claim 7, further comprising:
controlling the external device by a remote controller configured to control the projector remotely in case that the first projection mode is set by the mode setting section, and
disabling control of the external device by the remote controller in case that the second projection mode is set by the mode setting section.

12. A projector comprising:
a first source input section;
a second source input section;
a mode setting section configured to set a projection mode; and
a connection state detection section configured to detect whether or not an external device is connected to an external device connecting section
wherein
the first source input section is the external device connecting section which is configured so that the external device having an output terminal can be connected to the external device connecting section,
when a first projection mode is set by the mode setting section, image display or sound output is performed based on an input signal that is input via any one of the first source input section and the second source input section,
when a second projection mode is set by the mode setting section, image display or sound output is performed based on an input signal that is input via the second source input section, and
setting the second projection mode by the mode setting section is prohibited or disabled in case that the external device is detected being connected to the external device connecting section.

13. The projector according to claim 12, further comprising:
a source selection image generating section configured to generate a source selection image,
wherein
the source selection image generating section generates a source selection image displaying information corresponding to a source input section of the first source input section and the second source input section in case that the first projection mode is set by the mode setting section, and
the source selection image generating section generates a source selection image displaying information corresponding to the second source input section in case that the second projection mode is set by the mode setting section.

14. The projector according to claim 12, wherein
the mode setting section sets a mode corresponding to an installation state of a projector main body as the projection mode.

15. The projector according to claim 14, wherein the first projection mode is a floor-standing mode, and the second projection mode is a ceiling-mount mode.

16. The projector according to claim 12, further comprising:
- a remote controller configured to control the projector remotely, wherein
- the remote controller controls the external device in case that the first projection mode is set by the mode setting section, and
- control of the external device by the remote controller is disabled in case that the second projection mode is set by the mode setting section.

* * * * *